Patented Feb. 15, 1927.

1,617,353

UNITED STATES PATENT OFFICE.

WALTER O. SNELLING, OF ALLENTOWN, PENNSYLVANIA.

EXTRACTION OF GOLD FROM DILUTE SOLUTIONS.

No Drawing. Application filed February 12, 1925. Serial No. 8,831.

My invention relates to the extraction and recovery of gold from dilute solutions, and more particularly relates to the precipitation of gold from dilute solutions by contact with tellurium in amorphous condition.

It has long been known that when a metal is brought in contact with a solution of suitable concentration of a salt of a more electro-negative metal, the more electro-positive metal tends to dissolve, while a chemically equivalent amount of the more electro-negative metal tends to be deposited. A familiar example of this tendency is the forming of a stain of copper when a drop of a solution of copper sulphate is placed on a knife blade, and the precipitation of silver and lead by zinc are other familiar examples. The rule that any metal will, under favorable conditions, precipitate from solution any more electro-negative metal is a general one, and it is well known that metallic tellurium will precipitate gold from solution, in accordance with this general rule.

I have discovered that tellurium in the "mossy" or amorphous condition in which it exists after preciptation from solution has many advantages as a precipitating agent over tellurium in its usual crystalline or metallic condition, and is many times as efficient as a precipitating agent, and is capable of rapidly extracting gold from solutions of very great dilution.

In the preferred form of my invention, I first prepare a dilute solution of a suitable salt of tellurium, such as tellurium chloride for example, and I then precipitate the tellurium from this solution by a reagent such as sulfur dioxide. The tellurium slowly separates from the solution as a black precipitate of extreme fineness, and this precipitate, after being lightly compacted to give it somewhat increased density, forms a mass of high porosity. By passing a highly dilute solution of gold chloride or equivalent soluble salt of gold through a porous layer of amorphous precipitated tellurium prepared in the manner described and supported in any convenient way, I secure the practically instantaneous and complete recovery of the gold present in the solution.

It will of course be evident that where the dilute gold solution contains insoluble particles, the previous filtration of the gold solution is desirable to prevent the contamination and clogging of the porous tellurium filter mass, and where other constituents in the gold solution tend to have an oxidizing or dissolving effect upon the porous mass of amorphous tellurium, this tendency can be corrected by adding to the dilute gold solution a small amount of a protecting agent. I have found sulfur dioxide to be a particularly satisfactory and efficient protecting agent, and a very small amount of sulfur dioxide dissolved in the dilute gold solution is desirable to protect the amorphous tellurium from loss of activity.

The gold which is precipitated from solution by filtration through a porous mass of amorphous tellurium in the manner described may be recovered by heating the tellurium mass to a temperature above the volatilizing temperature of tellurium, and the volatilized tellurium may be recovered and reused.

It will be evident that many modifications may be made, without departing from the essential features of the invention as herein disclosed. Although in the preferred form of my invention I pass the dilute gold solution to be treated through a fixed mass of amorphous percipitated tellurium, it will of course be evident that it is the contact between the very finely divided tellurium and the dilute gold solution which is important, and that stirring the finely divided precipitated tellurium in the dilute gold solution, or precipitating the tellurium within the dilute gold solution, represent equivalent processes. In still another form of my invention I first impregnate a porous mass of earthenware or other equivalent material with a solution of a compound of tellurium soluble in water, and I then precipitate amorphous tellurium within the pore spaces of the porous body by the use of any suitable reagent, in much the same manner that semipermeable membranes are made by precipitating copper ferrocyanide within the pores of earthenware by the reaction between a soluble salt of copper and a solution of a suitable ferrocyanide. A porous mass made as described may conveniently be used as a support for an additional quantity of amorphous precipitated tellurium, and instead of a porous support of earthenware being used, the same principle may be used to impregnate cloth or other fabric with precipitated amorphous tellurium. I find the use of a fixed, slightly compacted layer of the amorphous precipitated tellurium, resting on a porous support and surmounted by a pre-filtering or protecting porous layer represents the most desirable arrangement for the rapid filtering of large volumes of dilute gold solutions under ordinary conditions.

Instead of obtaining tellurium in amorphous condition by precipitating a solution of a soluble compound of tellurium by sulfurous acid or a soluble sulfite or equivalent reducing agent, I may obtain finely divided tellurium in porous condition by attrition in a "colloid" mill or equivalent apparatus, and tellurium so obtained may be used as a filtering agent, either alone or preferably admixed with amorphous tellurium prepared by the action of reducing agents on solutions of a soluble compound of tellurium. Although I prefer to employ sulfur dioxide or sulfurous acid as my reducing agent in the precipitation of tellurium from solutions of its soluble compounds, I am aware that many other active reducing agents may be employed in the preparation of the amorphous precipitated material, and that under favorable conditions electrolytic reduction may also be employed instead of the use of chemical reducing reagents, and I may use any of the described methods in obtaining finely divided tellurium suitable for use in preparing a porous filtering mass for the treatment of dilute gold solutions.

I claim:

1. The process of extracting gold from dilute solutions which comprises passing a dilute solution of gold through a porous mass of amorphous precipitated tellurium.

2. The process of extracting gold from dilute solutions which comprises contacting a dilute gold solution with tellurium in amorphous precipitated condition.

3. The process of extracting gold from dilute solutions which comprises contacting a dilute gold solution containing sulfur dioxide with tellurium in amorphous precipitated condition.

4. The process which comprises filtering a dilute aqueous solution containing gold and contacting the filtered solution with tellurium in amorphous condition.

In testimony whereof, I have hereunto subscribed my name this 10th day of February, 1925.

WALTER O. SNELLING.